US012475117B2

(12) United States Patent
Kim

(10) Patent No.: US 12,475,117 B2
(45) Date of Patent: Nov. 18, 2025

(54) SYSTEM AND METHOD FOR DETERMINING OBJECT CARDINALITY IN OBJECT STORE DATABASE SYSTEMS

(71) Applicant: Teradata US, Inc., San Diego, CA (US)

(72) Inventor: Sung Jin Kim, Buena Park, CA (US)

( * ) Notice: Subject to any disclaimer, the term of this patent is extended or adjusted under 35 U.S.C. 154(b) by 0 days.

(21) Appl. No.: 18/400,163

(22) Filed: Dec. 29, 2023

(65) Prior Publication Data

US 2025/0217360 A1    Jul. 3, 2025

(51) Int. Cl.
*G06F 16/2453* (2019.01)

(52) U.S. Cl.
CPC .. *G06F 16/24537* (2019.01); *G06F 16/24545* (2019.01)

(58) Field of Classification Search
CPC ............ G06F 16/24537; G06F 16/24545
See application file for complete search history.

(56) References Cited

U.S. PATENT DOCUMENTS

| | | | | |
|---|---|---|---|---|
| 6,460,045 | B1* | 10/2002 | Aboulnaga | G06F 16/24545 707/999.102 |
| 6,529,901 | B1* | 3/2003 | Chaudhuri | G06F 16/2462 707/999.102 |
| 2005/0240624 | A1* | 10/2005 | Ge | G06F 16/8365 |
| 2017/0031967 | A1* | 2/2017 | Chavan | G06F 12/0802 |
| 2022/0050843 | A1* | 2/2022 | Hu | G06F 18/217 |
| 2023/0130738 | A1* | 4/2023 | Sengupta | G06F 16/2453 707/718 |

* cited by examiner

*Primary Examiner* — Jared M Bibbee

(57) ABSTRACT

In a database system, wherein data is stored as objects within an object storage system, a system and method for estimating object cardinality, determining query execution plan costs, and selecting a query plan for execution by the database system. Multiple object cardinality estimation approaches for estimating the number of objects to be accessed for a given query condition on a column of a relation composed of a set of objects, where each object maintains the minimum value and the maximum value of individual columns are presented. A set of global statistics is also maintained, consisting of the total number of objects and the minimum and maximum values of individual columns. The object cardinality estimation is determined based on the global statistics without retrieving individual object-level statistics.

14 Claims, 14 Drawing Sheets

FIG. 6A

SYSTEM AND METHOD FOR DETERMINING OBJECT CARDINALITY IN OBJECT STORE DATABASE SYSTEMS

FIELD OF THE INVENTION

This invention relates generally to database management systems and external object storage systems, and more particularly to improved methods for optimizing workload performance and costs within database management systems employing external cloud storage, such as public and private cloud storage solutions including Amazon Web Services (AWS), Microsoft Azure, Google Cloud, IBM Cloud, and others.

BACKGROUND OF THE INVENTION

Traditional database systems typically employ a cost-based query optimizer which functions to produce the most efficient access and execution plan to retrieve the data that satisfies a SQL query submitted by a user. This execution plan determines the steps, the order, the parallelism, and data access method that will most efficiently deliver the result for the submitted SQL query. Cardinality estimation—the process of estimating the number of distinct values or rows that will be returned by a specific database query or operation—is a crucial aspect of query optimization and is used to determine the most efficient query execution plan.

As object store database systems are increasingly employed in cloud platforms, such as Teradata Corporation VantageCloud Lake data platform, an updated process for estimating cardinality in systems where data is saved in objects is desired. Unlike traditional database systems, it is also crucial to estimate the number of objects that could include qualifying rows. The cost of accessing objects may be a nontrivial factor of processing a SQL query in object store database systems.

BRIEF DESCRIPTION OF THE DRAWINGS

Some implementations of the present disclosure are described with respect to the following figures.

FIG. 6A and FIG. 6B illustrate the storage of minimum and maximum column values at object and global levels within an object store.

DETAILED DESCRIPTION OF THE INVENTION

Figure 1:
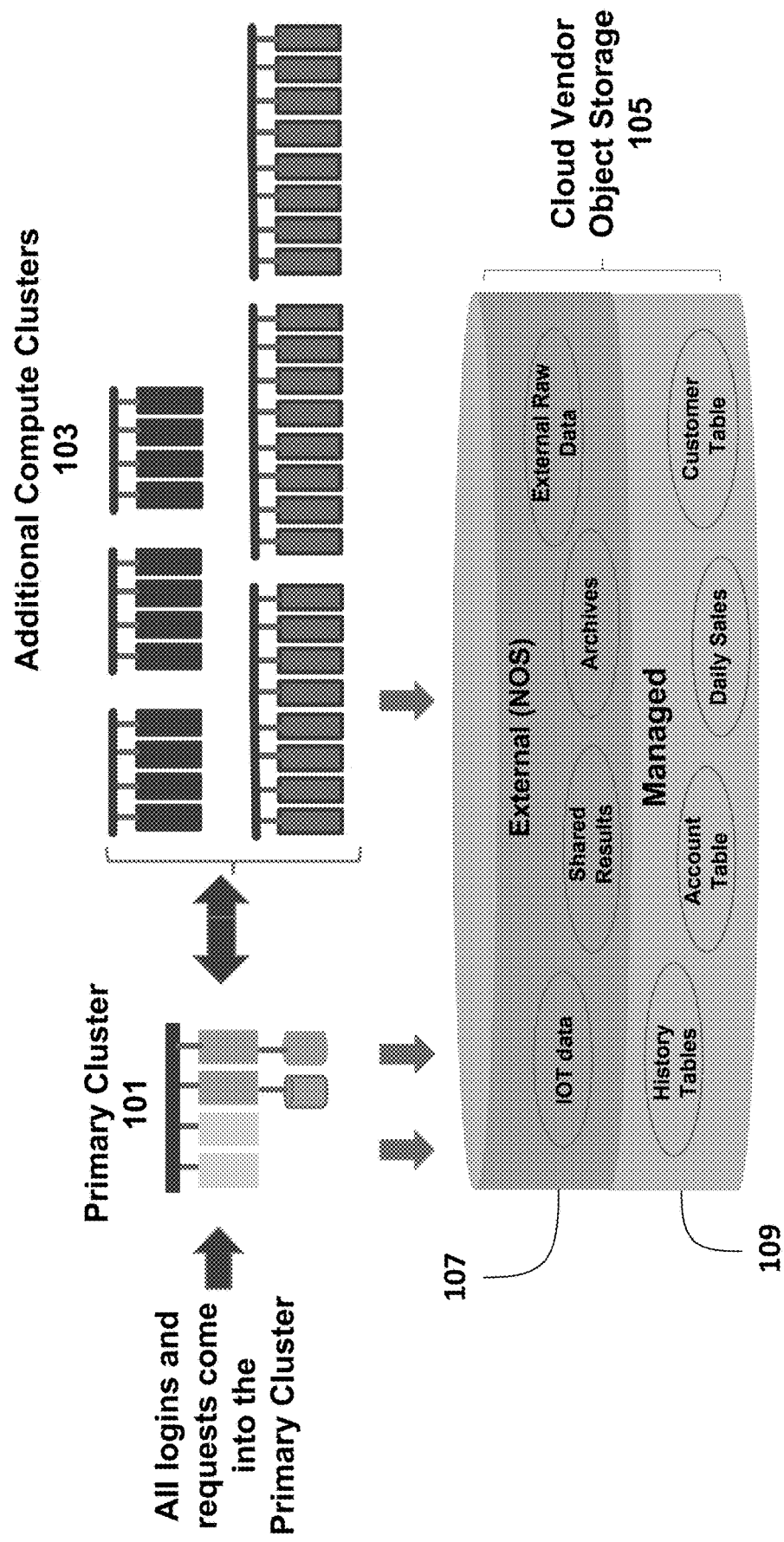
FIG. 1 is a block diagram of an example cloud native database arrangement that includes one or more database management nodes and an object-based remote data store.

FIG. 1 provides a basic block diagram of a VantageCloud Lake database environment. The major components of this system include a primary compute cluster 101, an analytics database forming the hub of the system environment; optional additional compute clusters 103, independent compute resources used to offload compute-intensive query steps from primary cluster 101; and cloud object storage 105 housing data which consists of data in external object storage 107 accessed using native object store (NOS) and owned and managed outside the database; and managed data 109 such as user tables, especially large tables, that are part of the database and can be shared by all compute clusters 103, but stored in cloud storage to reduce storage costs.

A parallel, scalable network connection is provided between primary cluster 101 and multiple compute clusters 103. This connection provides load balancing between multiple compute clusters and transfers finalized query steps to the compute clusters for execution.

Figure 2:
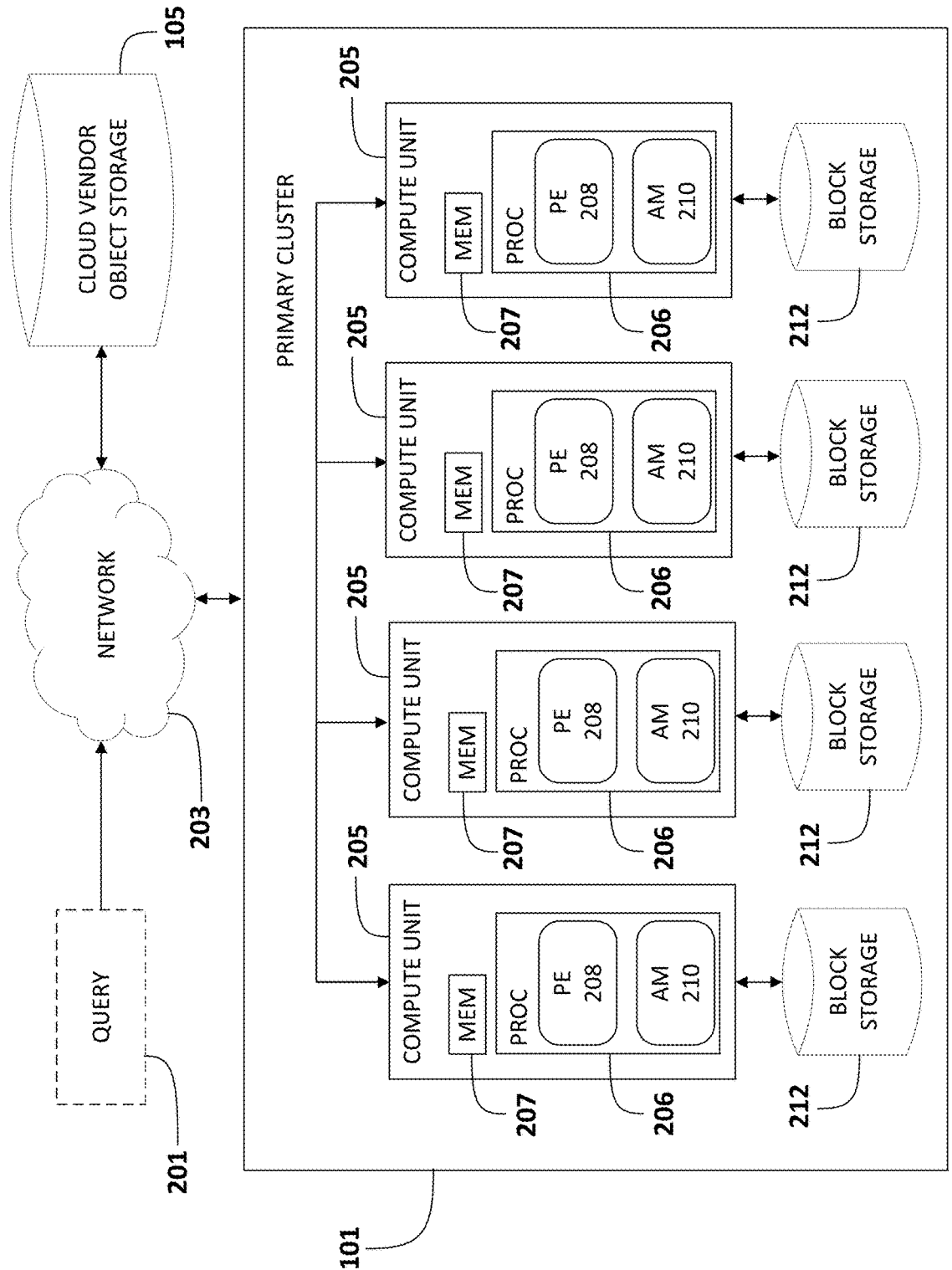
FIG. 2 is a block diagram of a database management node cluster encompassing a database management system.

Primary cluster 101 contains a database management system consisting of one or more network compute units or nodes 205 that manage the storage, retrieval, and manipulation of data stored on one or more block storage disks 212 as shown in FIG. 2. The database management system may be a combination of software (e.g., computer program routines, subroutines, applications, etc.) and hardware (e.g., processors, memory, etc.).

Generally, requests in the form of queries 201 are transmitted via a network 203 to the primary cluster 101, and responses are received therefrom. The database management system of primary cluster 101 performs the workload comprised of the one or more queries 201 against a relational database comprised of one or more tables storing data. Specifically, the database management system performs the functions described below, including accepting the workload comprised of the queries 201, generating one or more query execution plans (QEPs) from the queries 201, and then performing the query execution plans to process data retrieved from the tables. Moreover, the results from these functions may be provided directly to clients, may be provided to other systems (not shown) by network 203, or may be stored by the data management system in the database.

As shown in FIG. 2, primary cluster 101 is connected to cloud-based store 105 via a cloud network interface 203, wherein the cloud-based store 105 stores one or more objects (not shown), such as one or more datasets storing data. The cloud-based store 105 may be a distributed object store such as Amazon Simple Storage Service (Amazon S3), or a distributed file system such as Hadoop Distributed File System (HDFS). The database management system may retrieve the data from the objects in the cloud-based store 105, wherein the data is then stored in the relational database for use by the database management system in processing queries 201.

In one example, each compute unit 205 may include one or more physical processors 206 and memory 207. The memory 207 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 206 such as multiprocessing, multitasking, parallel processing and the like, for example.

The compute units 205 may include one or more other processing units such as parsing engine (PE) modules 208 and access modules (AM) 210. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors.

The parsing engine modules 208 and the access modules 210 may each be virtual processors (vprocs) and/or physical processors. In the case of virtual processors, the parsing engine modules 208 and access modules 210 may be executed by one or more physical processors, such as those that may be included in the compute units 205. For example, in FIG. 2, each parsing engine module 208 and access module 210 is associated with a respective compute unit 205 and may each be executed as one or more virtual processors by physical processors 206 included in the respective compute unit 205.

In FIG. 2, each compute unit 205 may include multiple parsing engine modules 208 and access modules 210, such that there are more parsing engine modules 208 and access modules 210 than compute unit 205.

The database management system stores data in one or more tables in block storage 212. In one example, the database system may be configured to distribute rows across access modules 210 and their associated block storage 212. These rows may include rows read from object store 105. Each parsing engine module 108 may organize the storage of data and the distribution of table rows and columns. The parsing engine modules 208 may also coordinate the retrieval of data from block storage 212 in response to queries received through connection with a network 203. The network 203 may be wired, wireless, or some combination thereof. The network 203 may be a virtual private network, web-based, directly-connected, or some other suitable network configuration.

Figure 3:
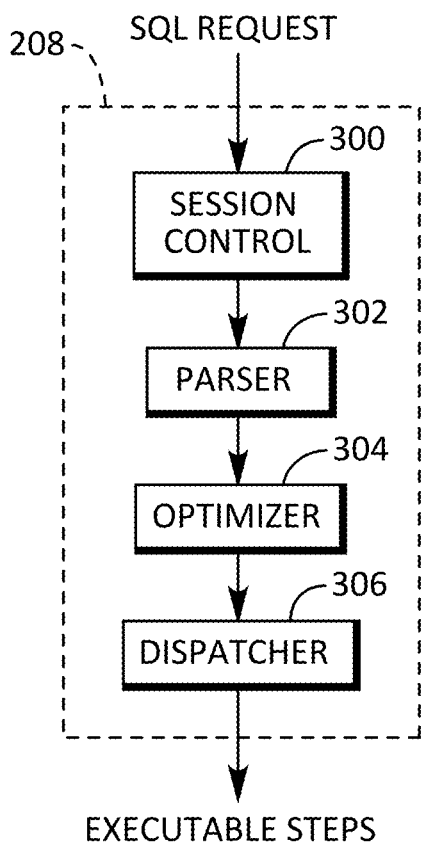
FIG. 3 is a block diagram of a parsing engine module within the example database management node cluster of FIG. 2.

In one example system, each parsing engine module 208 includes four primary components: a session control module 300, a parser module 302, an optimizer 304, and a dispatcher module 306 as shown in FIG. 3. The session control module 300 provides the logon and logoff functions. It accepts a request for authorization to access the database, verifies it, and then either allows or disallows the access. Once the session control module 300 allows a session to begin, an SQL request may be received such as through submission by a user and the SQL request is routed to the parser module 302.

Figure 4:
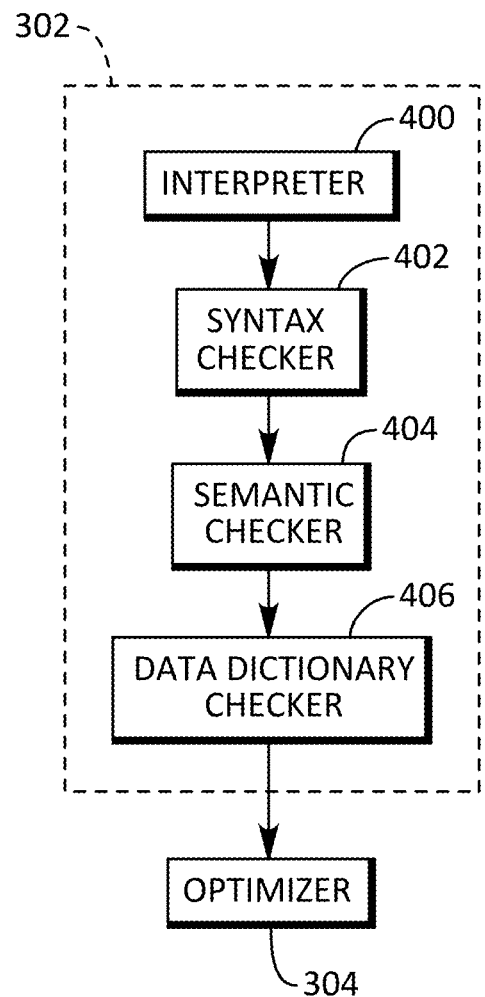
FIG. 4 is a block diagram of a parser module within the example database management node cluster of FIG. 2.

As illustrated in FIG. 4, the parser module 302 may include an interpreter module 400 that interprets the SQL request. The parser module 302 may also include a syntax checker module 402 that checks the request for correct SQL syntax, as well as a semantic checker module 404 that evaluates the request semantically. The parser module 302 may additionally include a data dictionary checker 406 to ensure that all of the objects specified in the SQL request exist and that the user has the authority to perform the request. The parsing engine module 208 implements the optimizer module 304 to select the least expensive plan to perform the request, and the dispatcher 306 coordinates the runtime execution of executable steps of the query execution plan of the optimizer module 304 with the access modules 210.

Selecting the optimal query-execution plan may include, among other things, identifying which primary cluster 101, compute clusters 103, and compute units 205 are involved in executing the query and which database tables are involved in the query, as well as choosing which data-manipulation techniques will serve best in satisfying the conditions of the query. To this end, for each parsing engine module 208, the parser module 302 (see FIG. 3), and/or optimizer module 304 may access a data dictionary module (not shown) specifically for parsing engine module 208.

The data dictionary module may specify the organization, contents, and conventions of one or more databases, such as the names and descriptions of various tables maintained by database management system as well as fields of each database, for example. Further, the data dictionary module 406 may specify the type, length, and/or other various characteristics of the stored tables. The database management system typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system separately or in conjunction with SQL. The data dictionary may be stored in block storage disks 212 or some other storage device and selectively accessed.

Referring again to FIG. 2, an interconnection 214 allows communication to occur within and between each compute unit 205. For example, implementation of the interconnection 214 provides media within and between each compute unit 205 allowing communication among the various processing units. Such communication among the compute units may include communication between parsing engine modules 208 associated with the same or different compute units 205, as well as communication between the parsing engine modules 208 and the access modules 210 associated with the same or compute units 205. Through the interconnection 214, the access modules 210 may also communicate with one another within the same associated compute unit 205 or other compute units 205.

The interconnection 214 may be hardware, software, or some combination thereof. In instances of at least a partial-hardware implementation the interconnection 214, the hardware may exist separately from any hardware (e.g, processors, memory, physical wires, etc.) included in the compute units 205 or may use hardware common to the compute units 205. In instances of at least a partial-software implementation of the interconnection 214, the software may be stored and executed on one or more of the memories 207 and processors 206 of the compute units 106 or may be stored and executed on separate memories and processors that are in communication with the compute units 205. In one example, interconnection 214 may include multi-channel media such that if one channel ceases to properly function, another channel may be used. Additionally, or alternatively, more than one channel may also allow distributed communication to reduce the possibility of an undesired level of communication congestion among compute units 205.

Compute clusters 103 exist as separate clusters of network-connected nodes independent of primary cluster 101. Each compute cluster 103 is separate and may be specialized. Compute clusters 103 enable the extension and scaling of system compute power.

Figure 5:
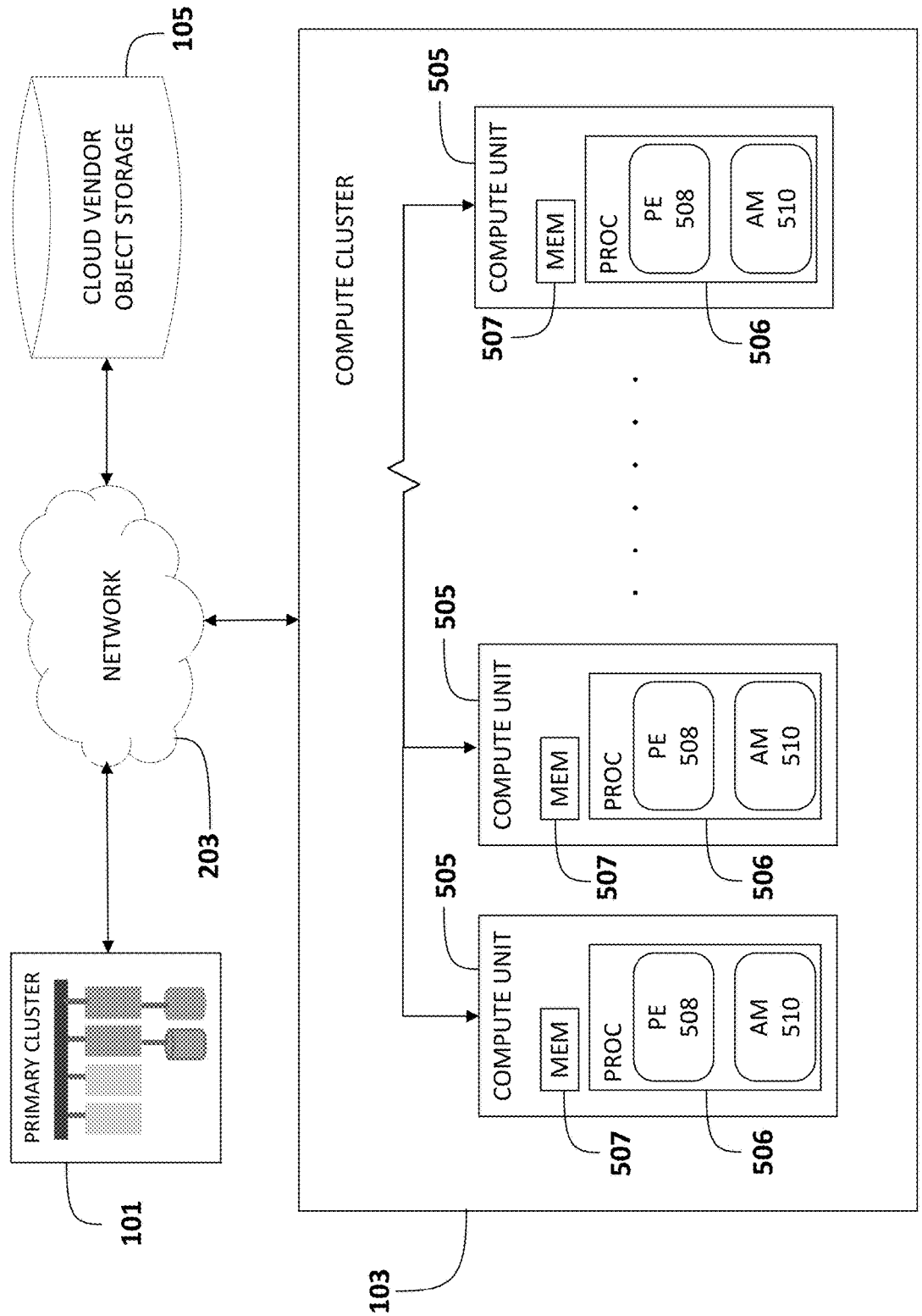
FIG. 5 is a block diagram of a compute node cluster.

As shown in FIG. 5, compute clusters 103 may contain one or more compute units or nodes 505, wherein each node 505 may include one or more physical processors 506 and memories 507. Compute clusters 103 include one or more parsing engine modules 508 and access modules 510, but unlike primary cluster 101, the compute clusters 103 do not have any persistent block storage for user data. Compute clusters 103 depend on the primary cluster parsing module 208 and optimizer 304 to direct the steps that the compute cluster will execute on behalf of a query. No query planning takes place on the compute cluster.

Compute clusters 103 do not have any permanent data. A data dictionary structure exists on a compute cluster, but it serves only the transient needs of the compute cluster. It does not contain table or column descriptions or details about statistics, indexes, or privileges. All that detail is maintained in primary cluster 101.

A compute cluster 103 can read large tables in object storage 105. It can also hold intermediate data, keeping it in memory or in internal drives.

Elasticity and extensible compute power is provided to the database platform via different quantities, configurations, and sizes of compute clusters 103. Each compute cluster 103 stands alone and executes queries that access object storage 105 to perform compute-intensive work such as analytic functions, freeing up primary cluster 101 to perform session management, parsing engine work, and tactical or other short-term work.

Depending on workload, a compute configuration may employ compute clusters having differing quantities of compute nodes 505 and processing capability. A compute cluster having a greater number of compute units or nodes 505 will accordingly have more processors 506, memory 507, access modules 510. With more access modules, a query or task assigned to a larger compute cluster can execute at a higher level of parallelism and deliver faster response times. Compute clusters can be categorized as either Small, Medium, Large, or X-Large depending upon the number of compute units or nodes 505 contained in a compute cluster 103.

A compute configuration may employ zero or many compute clusters, with compute clusters being added or removed to the configuration to meet workload needs. A compute configuration with zero compute clusters would consist of only primary cluster 101. Groupings of compute clusters can automatically scale up additional compute clusters based on resource demand or the number of active queries.

The optimizer 304 in the primary cluster 101 determines which query steps go to a compute cluster 103 and builds a query plan. During optimization, the work that a query needs to accomplish is broken into several steps. Some of these steps will execute on primary cluster 101, and if appropriate privileges are in place, some steps will execute on a compute cluster 103. Even if there are several compute clusters within a cluster configuration, a single query can only execute steps in one compute cluster. An execution plan may include processing a query step or two in primary cluster 101, and then processing one or more steps on a compute cluster 103. The compute cluster parsing engine 508 receives the query plan from primary cluster 101 and is responsible for dispatching steps down to the compute cluster access modules 510 for execution. When to use a compute cluster 103, what compute clusters to use, and the quantity of clusters to use, is determined by the optimizer in primary cluster 101 at the time the initial query plan is built.

Each cluster in the database environment is independent and isolated from other clusters, though queries can span a primary cluster 101 and one or more compute clusters 103 with communication between primary cluster 101 and compute clusters 103 occurring through a network connection 203. Data and instructions about how to execute query 201 may also be transmitted between the primary and compute clusters means of a data access layer referred to as data fabric, such as QueryGrid provided by Teradata Corporation. Results generated by compute clusters 103 are provided through the network or data fabric back to primary cluster 101.

Within an object store, minimum and maximum values of individual columns are typically maintained in objects. This information tells whether an object might have a row qualifying a given condition. For example, given a query "SELECT c1 as criteria1 FROM ProductTest WHERE test_id between 10 and 12;", objects whose maximum value of test_id is less than 10 or the minimum value of test_id is greater than 12 are guaranteed to not have any row qualifying the condition, so those objects are not to be accessed for answering the query.

An object cardinality estimation is critical for the optimizer to compute the cost of executing queries and come up with optimal execution plans. One example is to decide whether to scan all objects or to locate objects by an index (which maintains the minimum and the maximum values of objects for each column). Another example is to decide an object arrangement for a parallel join processing. If a few objects are estimated to be accessed for a join relation, then those objects could be assigned to all the parallel processing units redundantly, while objects of the other join relation are assigned to parallel processing units uniformly and mutually. The cost estimate is also used for a workload management system to control query executions and meet their service level goal. The object cardinality estimation is more critical than the estimation of the number of blocks in traditional database systems, since the latency of accessing objects is much larger.

Three object cardinality estimation approaches which exploit different statistics maintained within an object store are described herein: (1) general estimation, (2) stratified estimation, and (3) object-range-histogram-based estimation. The described approaches are applicable for estimating any storage units if those units maintain minimum and the maximum values of columns. For example, in Parquet, the solution can be used to estimate the number of row groups and/or the number of pages to be accessed.

Figure 6A:
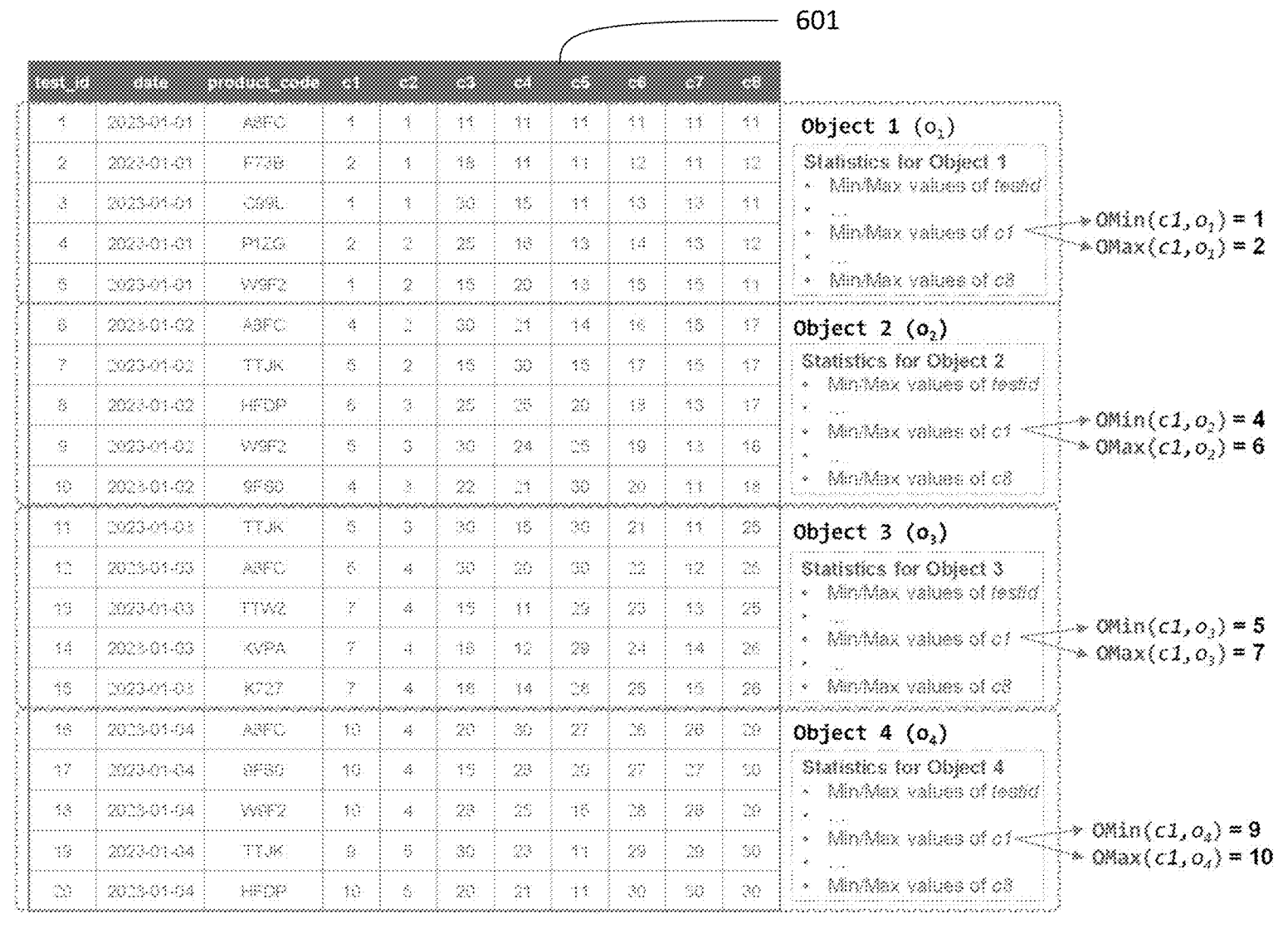
Figure 6B:
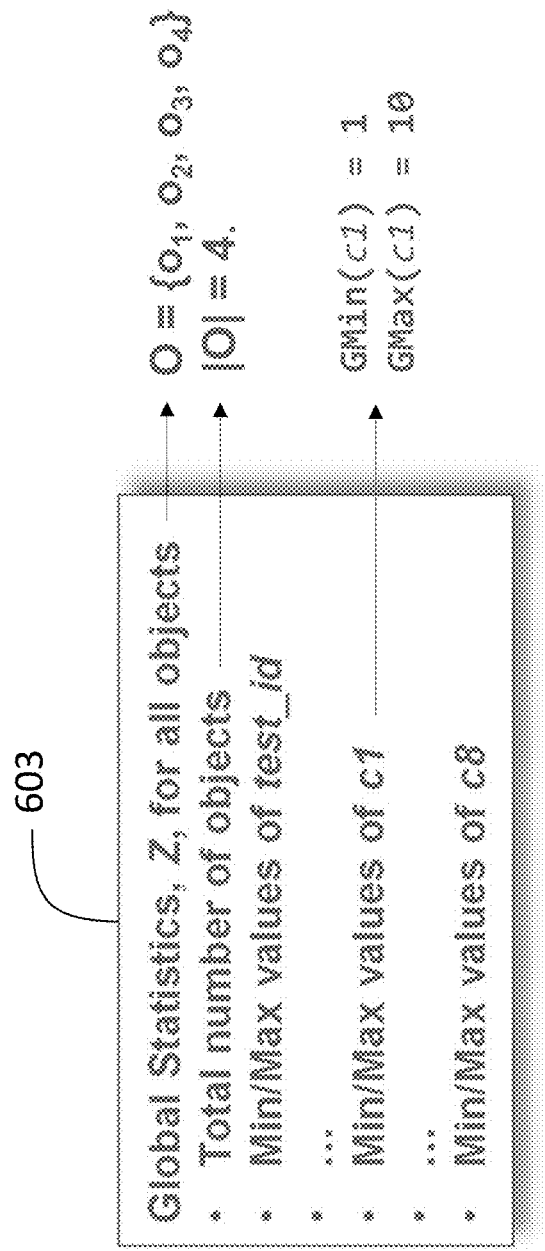

The object cardinality estimation approaches estimate the number of objects to be accessed for a given query condition q on a column c of a relation r composed of a set of objects O, where each object maintains the minimum value and the maximum value of individual columns. Together, FIG. 6A and FIG. 6B illustrate the cardinality estimation challenges to be resolved, with notations to be used throughout this specification and figures. ProductTest table 601 has eleven columns, labeled test_id, date, product_code, and c1 through c8; and has twenty data rows which are stored in four objects, identified as Object 1 or $O_1$, Object 2 or $O_2$, Object 3 or $O_3$, and Object 4 or $O_4$. The minimum value and the maximum value of each object and each column, are denoted as O Min(c,o) and O Max(c,o). A set of global statistics, Z, identified by reference numeral 603 in FIG. 6B, is also maintained, consisting of the total number of objects, denoted as |O|, and the minimum and maximum values of individual columns, denoted as G Min(c) and G Max(c). The object cardinality estimation, represented as E(q) is to be determined based on global statistics Z, without retrieving individual object-level statistics. In real world object store database systems, a table often consists of a large number of objects, and it is impractical to check the statistics of individual objects, requiring the use of global statistics for the calculation of E(q). These global statistics must be collected and maintained with minimal overhead.

Figure 7:
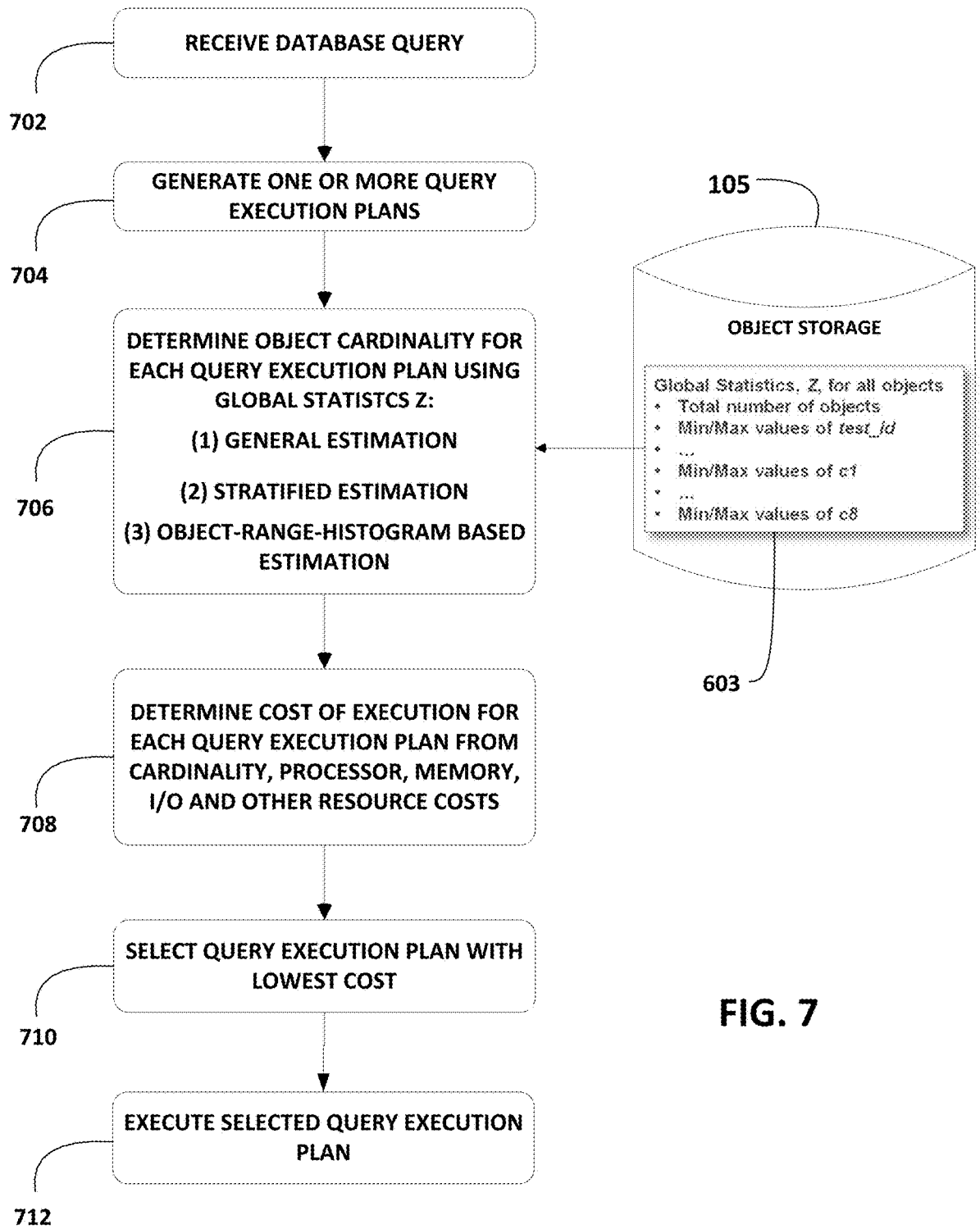
FIG. 7 is a flow diagram of a process for using object cardinality estimations to compute the cost of executing queries and selecting optimal query execution plans.

FIG. 7 illustrates a process using the object cardinality approaches described herein to compute the cost of executing queries and selecting optimal query execution plans. The process begins when the database system receives a query from a user (step 702). The database system optimizer 304 generates one or more query execution plans (step 704), determines the costs for each query execution plan (steps 706 and 708), and selects from the one or more execution plans the query execution plan having the lowest cost (step 710) for execution by the database system (step 712). As shown in step 706, part of the process for determining the costs of a query execution plan is the determination of the object cardinality of the execution plan using one of the three object cardinality approaches, (1) General Estimation, (2) Stratified Estimation, or (3) Object-Range-Histogram-Based Estimation, from global statistics 603 maintained for object storage 105. These approaches are described in detail below.

Solution 1: General Object Cardinality Estimation

Value Range. A value range is a set of contiguous values represented with a lower-bound (lb) and upper-bound (ub). A range is represented as [lb:ub] when the lower-bound and the upper-bound are included in the range. When boundaries are not included in a range, the range is represented as either {lb:ub] where lb is not included in the range, [lb:ub}, where ub is not included in the range, or {lb:ub} when neither lb nor ub is included in the range.

Figure 8:
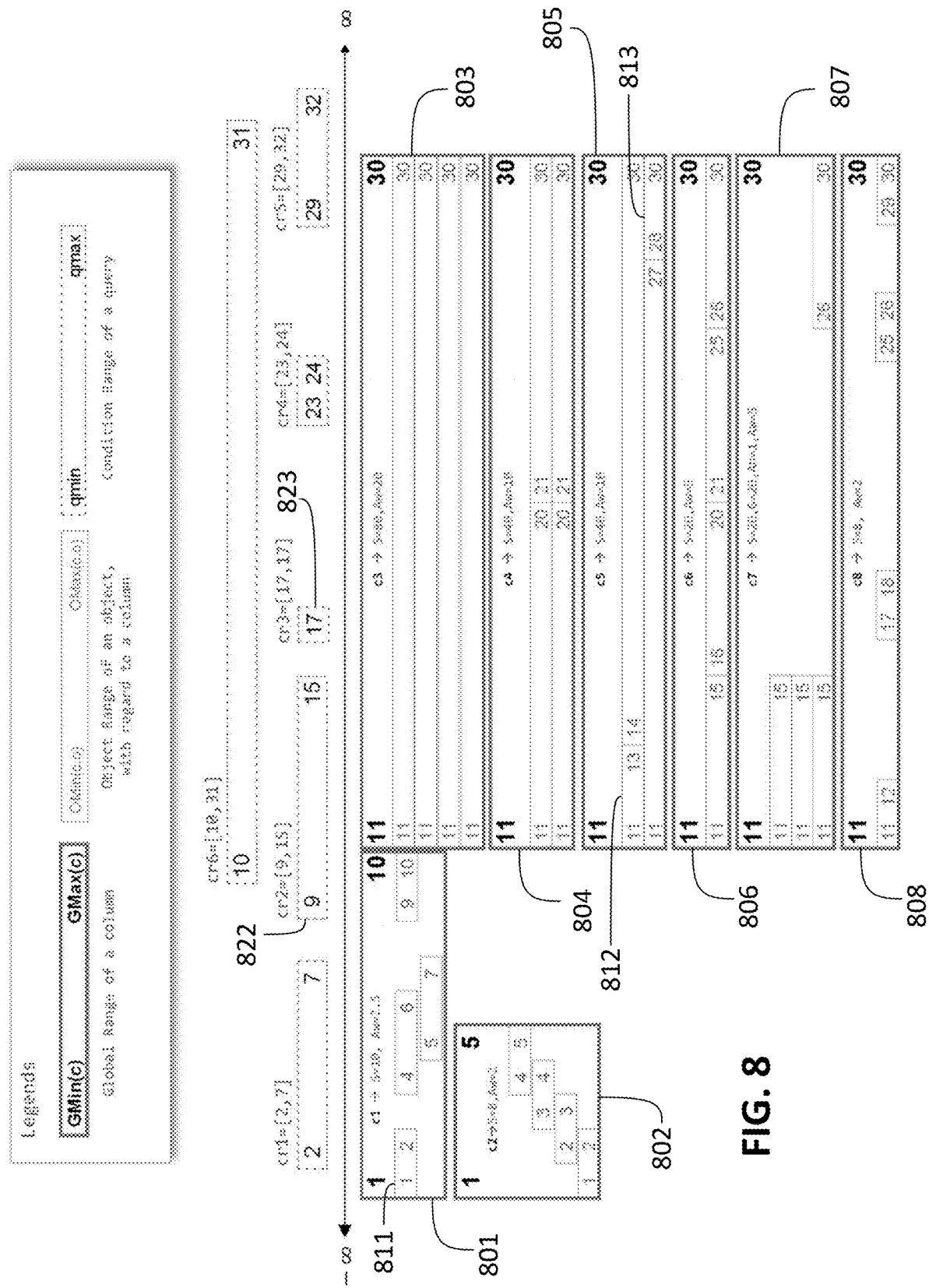
FIG. 8 provides an illustration of value ranges and widths for the example data provided in FIG. 6A and FIG. 6B.

Four Types of Value Ranges. This solution considers the following ranges: "global range", "object range", "condition range", and "qualified range", explained below. FIG. 8 illustrates the four types of value ranges for the data of FIG. 6A. Values are displayed from left (low) to right (high) in FIG. 8.

Global Range of column c is [G Min(c):G Max(c)]. Global ranges of columns c1 through c8 are illustrated as bold rectangles 801, 802, and 803-808 in FIG. 8, which are [1:10], [1:5], [11:30], . . . , and [11:30], respectively.

Object Range of a column c in an object O is [O Min(c,o):O Max(c,o)]. In FIG. 8, object ranges are illustrated as thin rectangles. For c1, object ranges of o1, o2, o3, and o4 are [1,2], [4,6], [5,7], and [9,10], e.g., rectangle 811.

Condition Range of a query q is represented as [c min:c max], where c min is the lower-bound and c max is the upper-bound of the condition that is queried to a database system. For example, suppose a user issues a SQL query which has "WHERE c1 between 9 and 15". Then, the condition range is [9,15]. Condition ranges are illustrated as dotted rectangles in FIG. 8, e.g., rectangles 822 and 823. For discreate data, the c min and c max can be set inclusively for a query condition. For example, given "WHERE age>=30 and age<35;", the condition range can be represented as [30,34]. For indiscrete data, the exclusion at the lower-bound and the upper-bound is represented by curly brace symbols. For example, given "WHERE weight>=30 and weight<35", the condition range can be represented as [30,35). For a point query, c min and c max are the same.

Qualified Range of a query q over a column c is an intersected range between the global range and the condition range, which is represented as [q min:q max]. For example, given "WHERE c1 between 9 and 15", the qualified range is [9,10], which is the intersected range between the condition range of [9:15] and the global range of [1:10].

Range Width. The width of a value range is denoted as W([lb:ub]), W([lb:ub}), W({lb:ub]), W({lb:ub}). For discrete data, the width is the number of possible values in the range. So, W([lb:ub])=(ub−lb)/gap+1, W({lb:ub])=W([lb:ub})=((ub−lb)/gap), and W({lb:ub})=((ub−lb)/gap)−1, where gap is a distance between two adjacent values. For the example data in FIG. 6A, the object range widths of o1, o2, o3, and o4 of column c1 are 2(=2−1+1), 3(=6−4+1), 3(=7−5+1), and 2(=10−9+1). For indiscrete data, the width is the distance between lb and ub. The width is computed to be "ub−lb", for W([lb:ub]), W({lb:ub]), W([lb:ub}), and W({lb:ub>), regardless of the exclusion or the inclusion of the boundaries.

Sum of Object Range Widths. A new statistic, the sum of object range widths of a column c, denoted as S(c,O) or simply S, is proposed to be maintained as a part of the global statistics Z. The sum is formally defined as the equation below. For example, FIG. 8 illustrates the sum of object range widths, for each of the columns c1 through c8, which are 10, 8, 80, 40, 40, 20, 20, and 8. Maintenance of S(c) needs a few arithmetic operations for each column, which can be done when the minimum value and the maximum value are updated for data insert/update/delete.

$$S(c, O) = \sum_{i=1}^{|O|} W([O\text{Min}(c, o_i) : O\text{Min}(c, o_i)])$$

Average of Object Range Widths. The average object range width of a column c, denoted as Aw or Aw(c,O), is defined as below. The average width of a column c is used to generalize object ranges within the global range of the column c. Note that the average width is not maintained in Z but derived from S and |O|.

$$Aw(c, O) = S(c, O) \div |O|$$

Object Cardinality Estimation (E(q) or simply E). Estimating the number of objects to be accessed for a query from O, is conceptually the same as estimating the number of object ranges which overlap a query condition range [q min:q max] within a global range [G Min:G Max]. For an unsatisfiable condition q, i.e., a qualified range does not exist like cr3 over c1 in FIG. 8, E(q) is 0. For a satisfiable condition, E is defined below, based on the assumption that all object ranges have the same width as the average width, and object ranges are evenly positioned in the global range. The formula is the multiplication of "the total number of objects" (i.e., |O|) and "the probability that an object overlaps a query range" (i.e., the outmost parentheses). The fraction represents the probability that an object does not overlap a query range. The denominator of the fraction represents the number of possible positions of an average-width object range within the global range. The numerator of the fraction represents the number of possible positions of an average-width object range which does not overlap the query range.

$E(q) = E(G\text{Min}, q\text{min}, q\text{max}, G\text{Max}, O, Aw)$, $$= |O| * \left(1 - \frac{\text{MAX}(W([G\text{Min}:q\text{min}\}) - Aw + 1, 0) + \text{MAX}(W(\{q\text{max}:G\text{Max}]) - Aw + 1, 0)}{W([G\text{Min}:G\text{Max}]) - Aw + 1}\right), \text{ for discrete data,}$$

$$= |O| * \left(1 - \frac{\text{MAX}(W([G\text{Min}:q\text{min}\}) - Aw, 0) + \text{MAX}(W(\{q\text{max}:G\text{Max}]) - Aw, 0)}{W([G\text{Min}:G\text{Max}]) - Aw}\right), \text{ for indiscrete data.}$$

Figure 9:
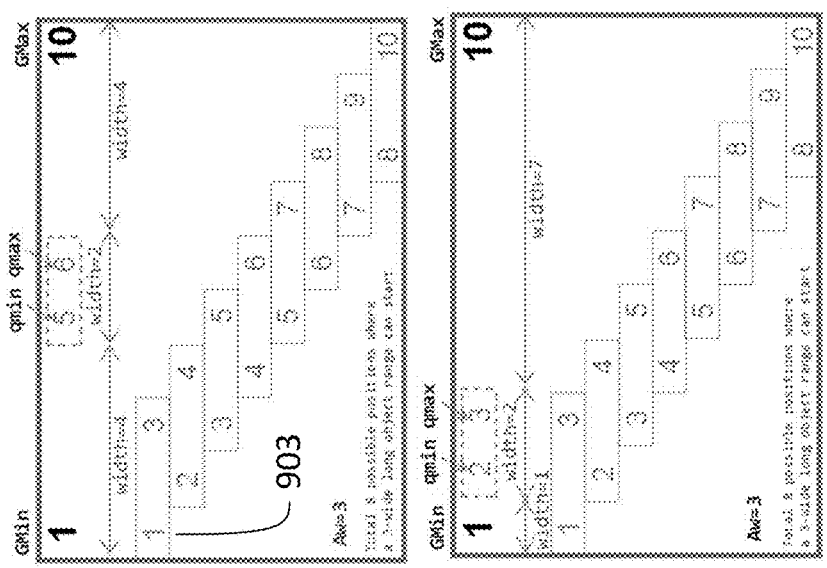
FIG. 9 provides examples of estimation queries used in a general object cardinality estimation in accordance with a first embodiment of the present invention.
Figure 10:
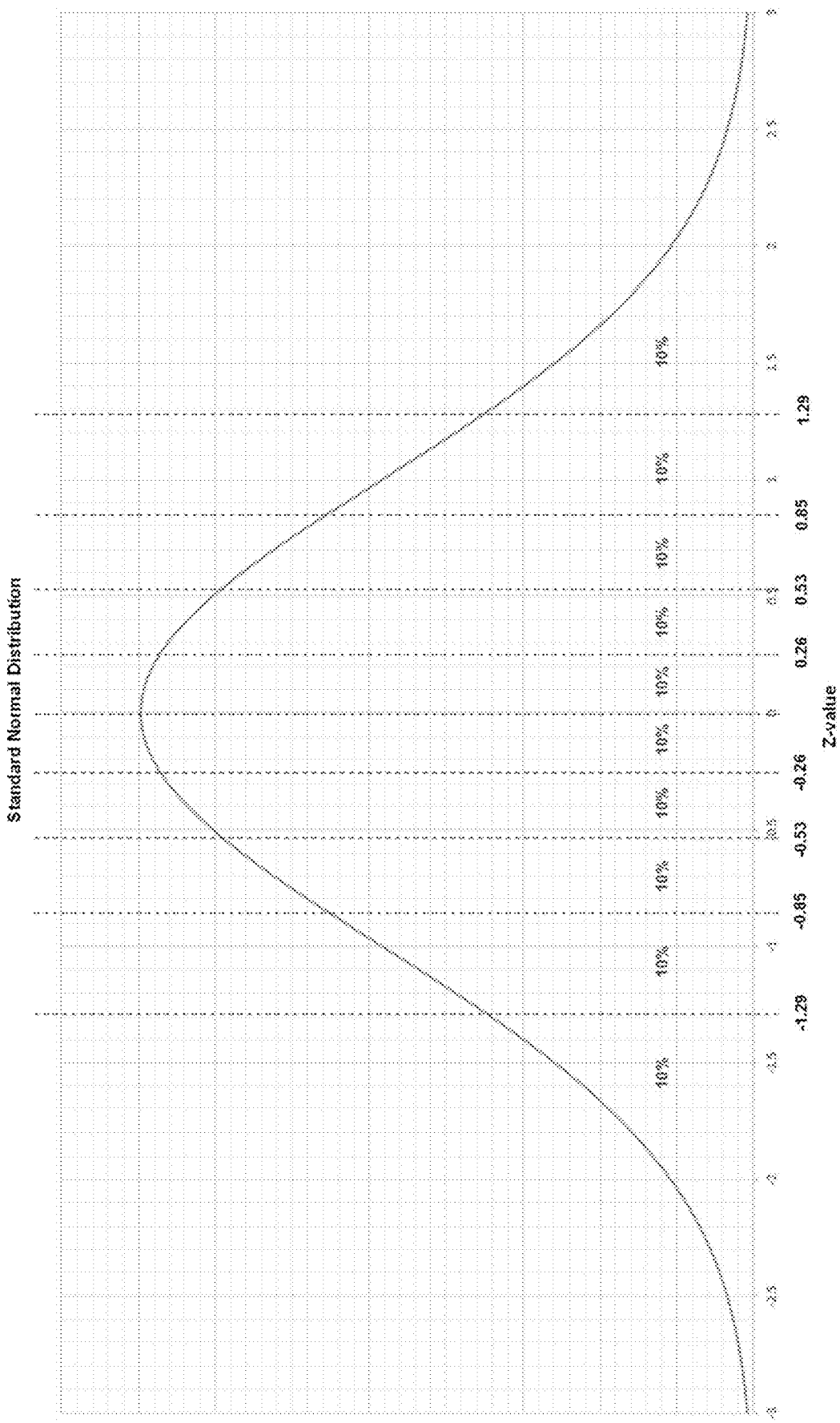
FIG. 10 shows object range widths for multiple groups of object value ranges having similar widths, displayed across a standard normal distribution, used in a Stratified Object cardinality estimation in accordance with a second embodiment of the present invention.

Intuition Behind E(q). FIG. 9 shows two estimation queries 901 and 902 with the condition ranges of [5:6] and [2:3], respectively, over the same column. The global range of the column is [1:10], and the average object width of the column, Aw(c,O), is 3. Referencing the first case 901, within the global range there are eight possible positions where a three-wide long object range can start, which are shown as thin rectangles, e.g., rectangle 903. Among the eight possible object ranges, two object ranges start before the query range without overlapping the beginning of the query range, and the other two object ranges start after the query range but do not exceed the global range. That is, four out of eight object ranges (i.e., 50%=4/8) do not overlap the query range and the other 50% object overlap the query range. Therefore, E(1, 5, 6, 10, O, 3) is computed to be |O|*50%. Let's see the second case. There is no object which can start before the query range without overlapping the query range. There are five objects which can start after the query range without exceeding the global range. Five out of eight (62.5%=5/8) objects do not overlap the query range, and 37.5% of objects overlap the query range. So, E(1, 2, 3, 10, O, 3) is computed to be |O|*37.5%

Solution 2: Stratified Object Cardinality Estimation

Limitation of the General Approach—Variance of Object Range Widths. The general estimate approach assumes that all the objects have the same widths as the average. When object range widths diverge significantly, the estimation inaccuracy could get larger. Comparing [15,26] over c4 (804) and c5 (805) in FIG. 8, within the same global range of c4 and c5, actual object range widths of c4 and c5 are different. Nevertheless, the average object range widths of c4 and c5 are the same, which does not indicate any difference of object ranges of c4 and c5. Therefore, E(q) for the query range [15:26] to c4 and c5 is computed to be 4 (which means that all the four objects are estimated to overlap the query range). This estimation is true for c4, where all individual object ranges widths are the same as the average. Within the global value range (whose width is 20) of c4, it's impossible to see that a ten-wide long object range does not overlap the query range, whose width is 12. However, when it comes to c5, we see two 3-wide long objects 812 and 813 which do not overlap the query range within the global range.

Stratified Estimation. The stratified estimation approach is to group object value ranges which have similar widths, then use an adjusted average value range for each group in the estimation. That is, E(q) is the sum of the estimated number of objects for each group. The differences of object range widths are assumed to follow a normal distribution. Considering ten groups for E(q), then each group consists of "|O|*10%" objects. According to the well-known probability density of the normal distribution (https://en.wikipedia.org/wiki/Normal distribution), 10% of the objects can be estimated to have widths less than Aw−1.29*σ, the next 10% of objects have widths between Aw−1.29*σ and Aw−0.85*σ, and so on, where σ is the standard deviation. FIG. 9 shows object range widths for each group.

Adjusted Object Count and Adjusted Average Width. Table 1 shows the adjusted object count and the adjusted average width for the estimation in each group. The adjusted average width is the value whose probability density function output is the mid-point of the two outputs of the probability density function for the minimum width and the maximum width in each group.

TABLE 1

Adjusted Object Count and Average Width

| Group | Target Object Ranges | Adjust Object Count | Adjusted Average Width |
|---|---|---|---|
| group 1 | For ranges whose widths are less than Aw − 1.29 u | |O| * 10% | Aw − 1.65 * u |
| group 2 | For ranges whose widths are between Aw − 1.29 u and Aw − 0.85 u | |O| * 10% | Aw − 1.04 * u |
| group 3 | For ranges whose widths are between Aw − 0.85 u and Aw − 0.53 u | |O| * 10% | Aw − 0.67 * u |
| group 4 | For ranges whose widths are between Aw − 0.53 u and Aw − 0.26 u | |O| * 10% | Aw − 0.38 * u |
| group 5 | For ranges whose widths are between Aw − 0.26 u and Aw | |O| * 10% | Aw − 0.12 * u |
| group 6 | For ranges whose widths are between Aw and Aw + 0.26 u | |O| * 10% | Aw + 0.12 * u |
| group 7 | For ranges whose widths are between Aw + 0.26 u and Aw + 0.53 u | |O| * 10% | Aw + 0.38 * u |
| group 8 | For ranges whose widths are between Aw + 0.53 u and Aw + 0.85 u | |O| * 10% | Aw + 0.67 * u |
| group 9 | For ranges whose widths are between Aw + 0.85 u and Aw + 1.29 u | |O| * 10% | Aw + 1.04 * u |
| group 10 | For ranges whose widths are greater than Aw + 1.29 u | |O| * 10% | Aw + 1.65 * u |

Maintenance and Computation of the Standard Deviation. To get the standard deviation, the sum of squared object widths for each column c, denoted as S2(c), are to be collected/maintained in Z while S(c) is collected/maintained. The standard deviation is the square root of the difference between S2(c) divided by |O| and the square of S(c) divided by |O|. That is, $\sigma = \sqrt{(S2(c)/|O|)-(S(c)/|O|)^2}$.

Determination of the number of groups. The number of groups can be determined based on the significance of the standard deviation. When the standard deviation is trivial or 0, regardless of how many groups are considered, the adjusted widths of all groups would be the same, which means that the stratified estimation becomes the same as the general estimate. When the standard deviation is significant, the more the groups are, the better the estimation accuracy is. If an adjusted average width is less than the minimum width or if the adjusted average width is greater than the maximum width, then the average width is adjusted to the minimum width and the maximum width. The statistics of the minimum width and the maximum width can be maintained additionally. Otherwise, the minimum width is set to 1 for discrete data and 0 for indiscrete data, and the maximum width is set to the global width of W([G Min:G Max]).

Solution 3: Object-Range-Histogram-Based Object Cardinality Estimation

Limitation of the General Approach—Skewed Positions of Object Ranges. The general estimate approach assumes that all object ranges are evenly positioned within the global range. When many object ranges are heavily jammed in certain subranges and/or much less object value ranges positioned in other subranges, the estimation accuracy may be negatively impacted. Referring to FIG. 8 and condition range cr2 (822) over c6 (806) and c7 (807), in both the cases, E(q) is represented as E(11, 11, 15, 31, O, 5). However, the actual number of qualified objects for c6 is 1, and that for c7 is 3. Likewise, for cr3 (823) over c6 and c7 E(q) is (11, 17, 17, 30, O, 5) for both c6 and c7, but, the actual numbers of qualified objects for c6 and c7 are 1 and 0. To mitigate this type of inaccuracy, an object-range-histogram-based estimation approach is proposed.

Object Range Histogram. The object range histogram of a column c, ORH(c) or simply ORH, is a set of intervals which are mutually exclusive subranges consisting of the global range of the column c, and which keep the information of the objects that overlap individual subranges. The ORH can give an insight where object ranges are positioned within the global range. For discrete data, the range of the k'th interval is represented as [I Min k(c):I Max k(c)]. For indiscrete data, the interval k can be represented as [I Min k(c):I Max k(c)} or {I Min k(c):I Max k(c)].

Four Object Types. A set of objects which overlap the interval k is denoted as $O_k$. Objects in $O_k$ are classified into four types. First, there are objects whose ranges cover the interval k entirely and overlap the interval (k−1) and the interval (k+1). A set of the first-type objects is denoted as $\overleftrightarrow{O}_k$. Second, there are objects whose ranges overlap the interval k and interval (k−1), but do not overlap (k+1). A set of the second-type objects is denoted as $\overleftarrow{O}_k$. Third, there are objects whose range overlaps the interval k and the interval (k+1), but do not overlap the interval (k−1). A set of the third-type objects is denoted as $\overrightarrow{O}_k$. Fourth, there are objects whose ranges overlap the interval k only, do not overlap the interval (k−1) and the interval (k+1). A set of the fourth-type objects is denoted as $\overline{O}_k$. The number of objects in $O_k$ is represented as $|O_k|$. Likewise, the number of objects in $\overleftrightarrow{O}_k$, $\overleftarrow{O}_k$, $\overrightarrow{O}_k$ and $\overline{O}_k$ is represented as $|\overleftrightarrow{O}_k|$, $|\overleftarrow{O}_k|$, $|\overrightarrow{O}_k|$, and $|\overline{O}_k|$, respectively. The sum of overlapped range widths between the interval k and the objects in $O_k$, $\overleftrightarrow{O}_k$, $\overleftarrow{O}_k$, $\overrightarrow{O}_k$ and $\overline{O}_k$ is denoted as $S_k(c, O_k)$, $S_k(c, \overleftrightarrow{O}_k)$, $S_k(c, \overleftarrow{O}_k)$, $S_k(c, \overrightarrow{O}_k)$, and $S_k(c, \overline{O}_k)$, respectively. The sum of squared overlapped range widths between the interval k and the objects in $O_k$, $\overleftrightarrow{O}_k$, $\overleftarrow{O}_k$, $\overrightarrow{O}_k$ and $\overline{O}_k$ is denoted as $S2_k(c, O_k)$, $S2_k(c, \overleftrightarrow{O}_k)$, $S2_k(c, \overleftarrow{O}_k)$, $S2_k(c, \overrightarrow{O}_k)$, and $S2_k(c, \overline{O}_k)$, respectively.

Figure 11:
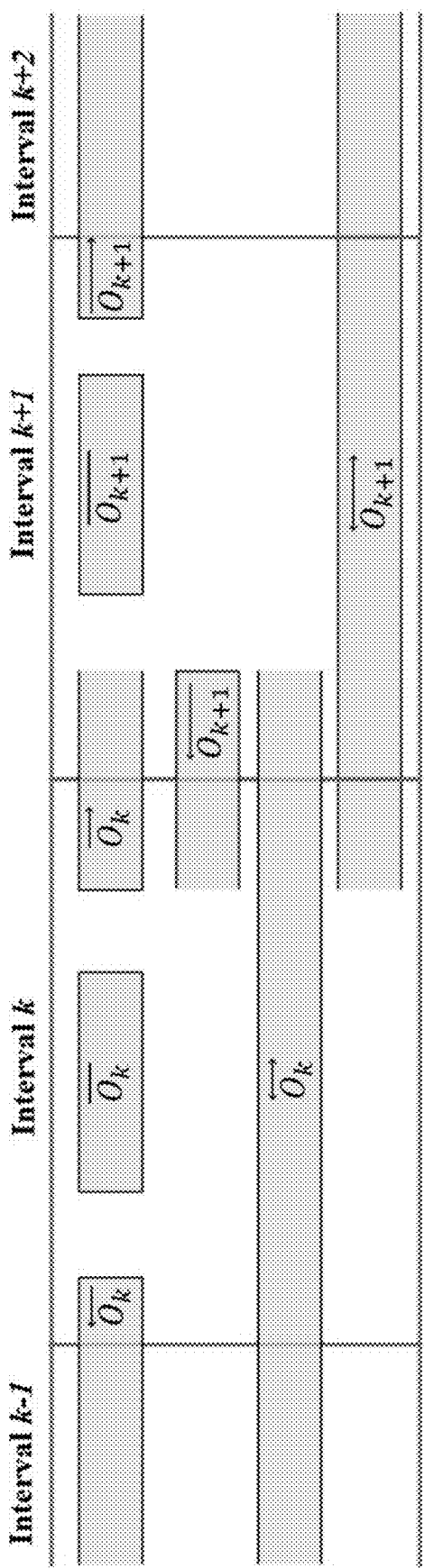
FIG. 11 illustrates the relationship between object types and intervals in an object range histogram of a column of a relation composed of a set of objects.

Scope of the Statistics of an interval. FIG. 11 illustrates the four types of objects in terms of intervals k and (k+1). One major philosophy is that the statistics for interval k focus on the interval k itself and adjacent intervals. The statistics for an interval are not concerned about the global layout of objects. So, there is no information telling how many objects in $\overrightarrow{O}_k$ span interval k+2, which means it is not obvious how many objects in $\overrightarrow{O}_k$ belong to $\overleftrightarrow{O}_{k+1}$ or $\overleftarrow{O}_{k+1}$ of interval (k+1). Likewise, an object in $\overleftrightarrow{O}_k$ may belong to $\overleftrightarrow{O}_{k+1}$ or $\overleftarrow{O}_{k+1}$ of interval (k+1). However, it is obvious that the sum of $|\overleftrightarrow{O}_k|$ and $|\overrightarrow{O}_k|$ equals the sum of $|\overleftrightarrow{O}_{k+1}|$ and $|\overleftarrow{O}_{k+1}|$.

Figure 12:
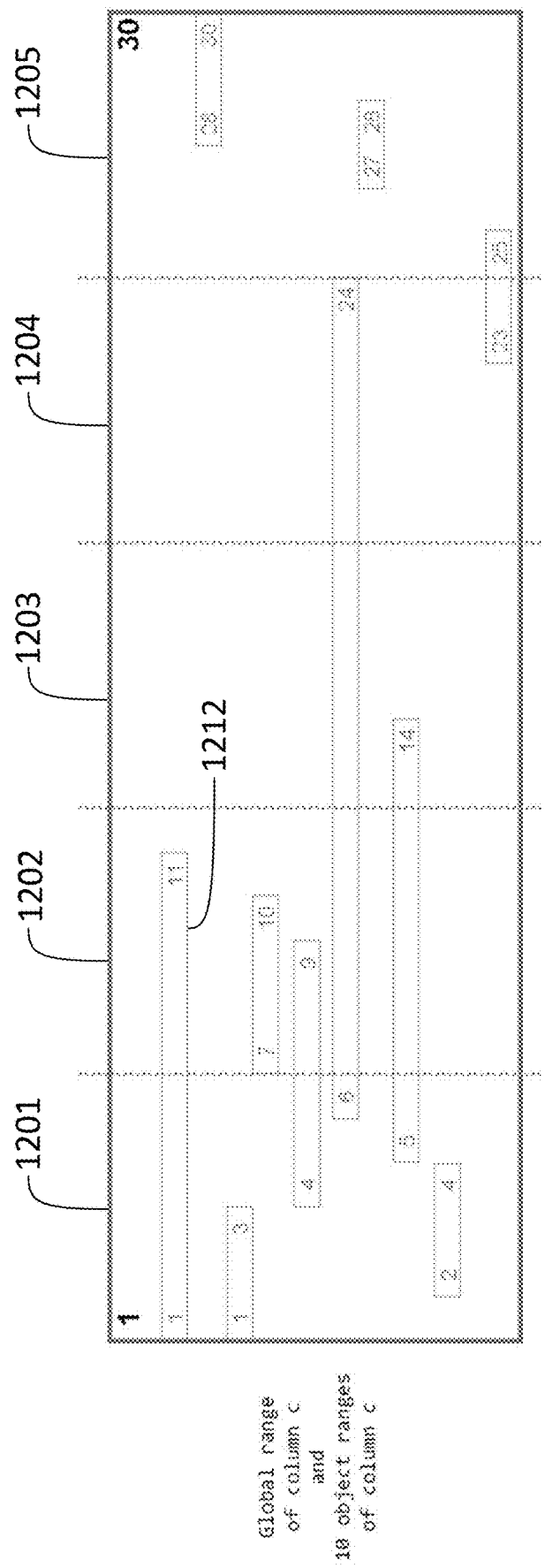
FIG. 12 provides an example of an object range histogram.

Example of Object Range Histogram. FIG. 12 shows an example of ORH having five equal-width intervals, 1201 through 1205, for ten objects, e.g., object 1212, in the global range of [1:30]. There are six objects which overlap first interval 1101, i.e., $|O_1|=6$. Among these six objects, four object ranges span the next interval 1102, i.e., $|\overrightarrow{O}_1|=4$. The sum of the overlapped ranges between the first interval and the four objects is 12, i.e., $S_k(c, \overrightarrow{O}_1)=12$. There are two objects whose ranges are covered by first interval 1101 completely without overlapping any other intervals, i.e., $|\overline{O}_1|=2$. The sum of the overlapped ranges between the first interval and the two objects is 6, i.e., $S_k(c, \overline{O}_1)=6$. Note that the statistics shown in FIG. 12 do not mean all of them must be stored and maintained physically. Some of the statistics can be derived from the others.

Three Kinds of ORH. Depending on the information kept for each interval, three types of ORHs can be used. As more information is kept for intervals, the complexity of maintaining/using an ORH is increased, but a better estimation accuracy is expected.

ORH-1: It does not distinguish objects into the four types. Maintained are $|O_k|$, $S_k(c, O_k)$, and $|\overrightarrow{O}_k|$. The statistic of $|\overrightarrow{O}_k|$ is required to avoid an overestimation caused by redundant object counting by adjacent intervals.

ORH-2: It does distinguish objects into the four types. Maintained are the statistics of $|\overleftrightarrow{O}_k|$, $|\overleftarrow{O}_k|$, $|\overrightarrow{O}_k|$, $|\overline{O}_k|$, $S_k(c, \overleftrightarrow{O}_k)$, $S_k(c, \overleftarrow{O}_k)$, $S_k(c, \overrightarrow{O}_k)$, and $S_k(c, \overline{O}_k)$.

ORH-3: It does distinguish objects into the four types and considers possible length variations for each interval (so Solution 2 can be used for each interval). Maintained are the statistics of $|\overleftarrow{O}_k|$, $|\overrightarrow{O_k}|$, $|\overrightarrow{O_k}|$, $|\overline{O_k}|$, $S_k(c, \overleftarrow{O_k})$, $S_k(c, \overrightarrow{O_k})$, $S_k(c, \overrightarrow{O_k})$, $S_k(c, \overline{O_k})$, $S2_k(c, \overleftarrow{O_k})$, $S2_k(c, \overrightarrow{O_k})$, $S2_k(c, \overrightarrow{O_k})$, and $S2_k(c, \overline{O_k})$, E(q) with ORH-1. The first step is to identify the qualified range, i.e., [q min:q max] and the intervals that overlap the qualified range. The second step is to combine those intervals to one interval. The first and the second steps can be done progressively while scanning intervals. Let us suppose m number of intervals which overlap a given query range condition, from interval k through interval (k+m), the statistics of the combined interval can be determined as shown below, and E(q) can be computed as if the combined interval is the global range.

- $|O_{combined}| = |O_k| - |\overrightarrow{O_k}| + |O_{k+1}| - |\overrightarrow{O_{k+1}}| + \ldots |O_{k+m-1}| - |\overrightarrow{O_{k+m-1}}| + |O_{k+m}|$
- $S_{combined}(c, O_{combined}) = S_k(c, O_k) + S_{k+1}(c, O_{k+1}) + \ldots + S_{k+m}(c, O_{k+m})$
- $E(q) = E(IMin_k, qmin, qmax, IMax_{k+m}, |O_{combined}|, (S_{combined}(c, O_{combined})/|O_{combined}|))$.

E(q) with ORH-2 and ORH-3. The estimation with ORH-2 and ORH-3 is performed on individual intervals, and the estimated number of objects to be accessed for each interval are summed up and become the final estimate. The estimate for an interval k is denoted as $E_k(q)$. Table 2 shows five estimation cases for $E_k(q)$, followed by how $E_k(q)$ is computed.

TABLE 2

Five estimation cases for an interval

| | Description | Conditions |
|---|---|---|
| Case 1 | A condition range and the interval k are disjoint | qmin <= qmax < IMin or IMax < qmin <= qmax |
| Case 2 | A condition range spans the interval k and (k + 1), but does not span interval (k − 1) | IMin < qmin < IMax < qmax |
| Case 3 | A condition range spans the intervals (k − 1) and (k + 1) | qmin < IMin < IMax < qmax |
| Case 4 | A condition range spans the intervals k and (k − 1), but does not span interval (k + 1) | qmin < IMin < qmax < IMax |
| Case 5 | A condition range is a subset of interval k, so does not span intervals (k − 1) and (k + 1). | IMin < qmin <= qmax < IMax |

For Case 1, $E_k(q)$ is 0.

For Case 2, $E_k(q)$ is the sum of the following components.

With ORH-2, the second component is $|\overleftarrow{O_k}|$ or 0, according to the average width of the left-spanning objects. With ORH-3, objects can be stratified further by Solution 2 with the standard deviation. The third component can also be stratified with ORH-3.

$|\overleftarrow{O_k}| + |\overrightarrow{O_k}|$

If $|\overleftarrow{O_k}|>0$ and G min<(I Min+$S_k(c, \overleftarrow{O_k})/|\overleftarrow{O_k}|$), then $|\overleftarrow{O_k}|$, else 0

E(I Min, q min, I Max, I Max, $\overline{O_k}$, $S_k(c, \overline{O_k})/|\overline{O_k}|$)).

For case 3, $E_k(q)$ is $|\overleftarrow{O_k}|+|\overleftarrow{O_k}|+|\overrightarrow{O_k}|+|\overline{O_k}|-(|\overrightarrow{O_{k-1}}|+|\overrightarrow{O_{k-1}}|)$.

For case 4, $E_k(q)$ is the sum of the following components.

With ORH-2, like Case 2, the second component is $|\overrightarrow{O_k}|$ or 0, according to the average width of the right-spanning objects. With ORH-3, the second and the third components can be stratified further.

$|\overleftarrow{O_k}|+|\overleftarrow{O_k}|-|\overrightarrow{O_{k-1}}|+|\overrightarrow{O_{k-1}}|$ If $|\overrightarrow{O_k}|>0$ and G max<(I Max+$S_k(c, \overrightarrow{O_k})/|\overrightarrow{O_k}|$), then $|\overrightarrow{O_k}|$, else 0

E(I Min, I Min, q max, I Max, $\overline{O_k}$, $S_k(c, \overline{O_k})/|\overline{O_k}|$)).

For Case 5, with ORH-2, Ek(q) is the sum of the following components. With ORH-3, the second, the third, and the fourth components can be stratified.

$|\overleftrightarrow{O_k}|$

If $|\overleftarrow{O_k}|>0$ and G min$<$(I Min+$S_k$(c, $\overrightarrow{O_k}$)/$|\overleftarrow{O_k}|$), then $|\overleftarrow{O_k}|$, else 0

If $|\overrightarrow{O_k}|>0$ and G max$<$(I Max-$S_k$(c, $\overrightarrow{O_k}$)/$|\overrightarrow{O_k}|$), then $|\overrightarrow{O_k}|$, else 0

E(I Min, c min, c max, I max, $\overline{O_k}$, $S_k$(c, $\overrightarrow{O_k}$)/$|\overrightarrow{O_k}|$)).

Interval Creation. For the use of an ORH, intervals must be created first as objects are generated. When the global minimum and the global maximum values are known (e.g., when application domain experts know, when an object-store table is created from another object-store table, or object-store tables are reorganized, etc.), equal-width intervals can be created as many as the threshold of the maximum number of intervals. Otherwise, intervals can be created as new objects are generated and when existing intervals do not cover a new object range. Let suppose a new object range, in terms of a column c, i.e., [O Min(c,o):O Max(c,o)]. When there is no interval, an interval can be created with the range of [O Min(c,o):O Max(c,o)]. When O Min(c,o)$<$I Min 1(c), a new interval can be created as the range of [O Min(c,o):I Min i(c)]. When I Max$_n$(c)$<$O Max(c,o), where n is the number of intervals in ORH, a new interval can be created as the range of {I Max$_n$(c):O Max(c,o)].

Figure 13:
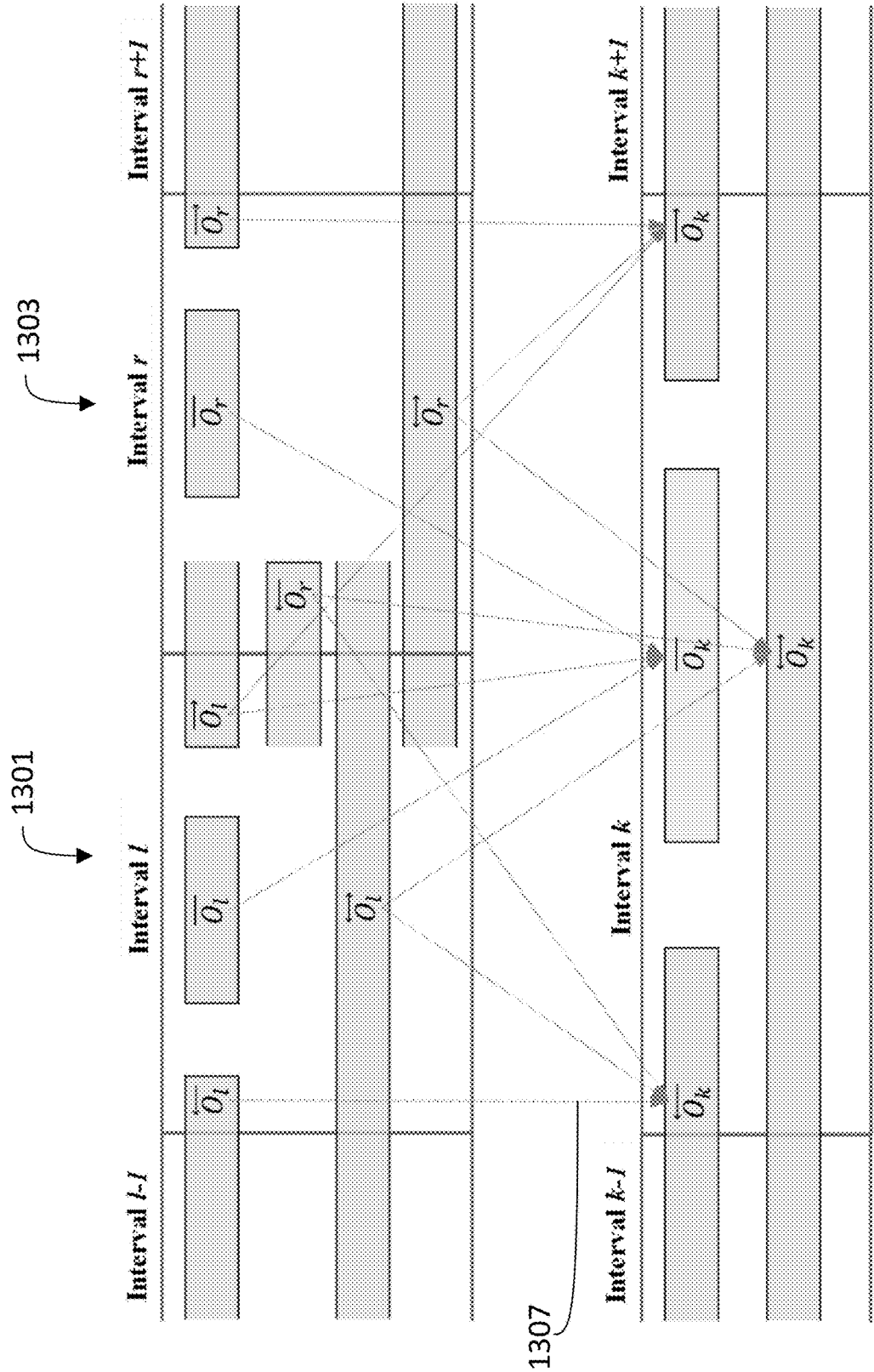
FIG. 13 provides an illustration of interval merging employed to reduce the number of intervals within a histogram.

Interval Merging. The interval merging is to combine two adjacent intervals l and r, and create a new interval k which covers both intervals l and r. This merging can be performed if the number of intervals is greater than or close to the threshold of the maximum number of intervals. For ORH-1, the merging process is simple. For ORH-2 and ORH-3, FIG. 13 shows how the four types of objects in intervals l (1301) and r (1303), could be counted in the merged interval k (1305). It is obvious that all objects in $\overleftarrow{O_r}$ belong to $\overleftarrow{O_k}$, because it is guaranteed that an object in $\overleftarrow{O_r}$ cannot span interval k+1. Likewise, it is obvious that all objects in $\overrightarrow{O_r}$ belong to $\overrightarrow{O_k}$. It is also obvious that all objects in $\overline{O_l}$ and $\overline{O_r}$ belong to $\overline{O_k}$. Those obvious relationships are represented as an arrow starting from an object type in FIG. 13, e.g., arrow 1307 from $\overleftarrow{O_l}$ to $\overleftarrow{O_k}$. On the other hand, it is not obvious how many objects $\overrightarrow{O_l}$, $\overrightarrow{O_r}$, $\overleftarrow{O_l}$ and $\overleftarrow{O_r}$, belong to $\overline{O_k}$, $\overrightarrow{O_k}$, $\overleftarrow{O_r}$ and $\overleftarrow{O_l}$, as shown in arrows going to two object types for interval k. One simple strategy to determine an after-merge object type is assuming that objects in $\overrightarrow{O_l}$ and $\overleftarrow{O_l}$, correspond to $\overleftarrow{O_r}$ and $\overrightarrow{O_r}$ in proportion to the ratio of $|\overleftarrow{O_r}|$ and $|\overrightarrow{O_r}|$. That is, for $\overrightarrow{O_l}$, $|\overrightarrow{O_l}|*(|\overleftarrow{O_r}|*(|\overleftarrow{O_r}|+|\overrightarrow{O_r}|))$ objects belong to $\overline{O_k}$, and $|\overrightarrow{O_l}|*(|\overleftarrow{O_r}|*(|\overleftarrow{O_r}|+|\overrightarrow{O_r}|))$ objects belong to $\overrightarrow{O_k}$. For $\overleftarrow{O_l}$, $|\overleftarrow{O_l}|*(|\overleftarrow{O_r}|*(|\overleftarrow{O_r}|+|\overrightarrow{O_r}|))$ objects belong to $\overline{O_k}$, and $|\overleftarrow{O_l}|*(|\overleftarrow{O_r}|*(|\overleftarrow{O_r}|+|\overrightarrow{O_r}|))$ objects belong to $\overleftarrow{O_k}$.

Figure 14:
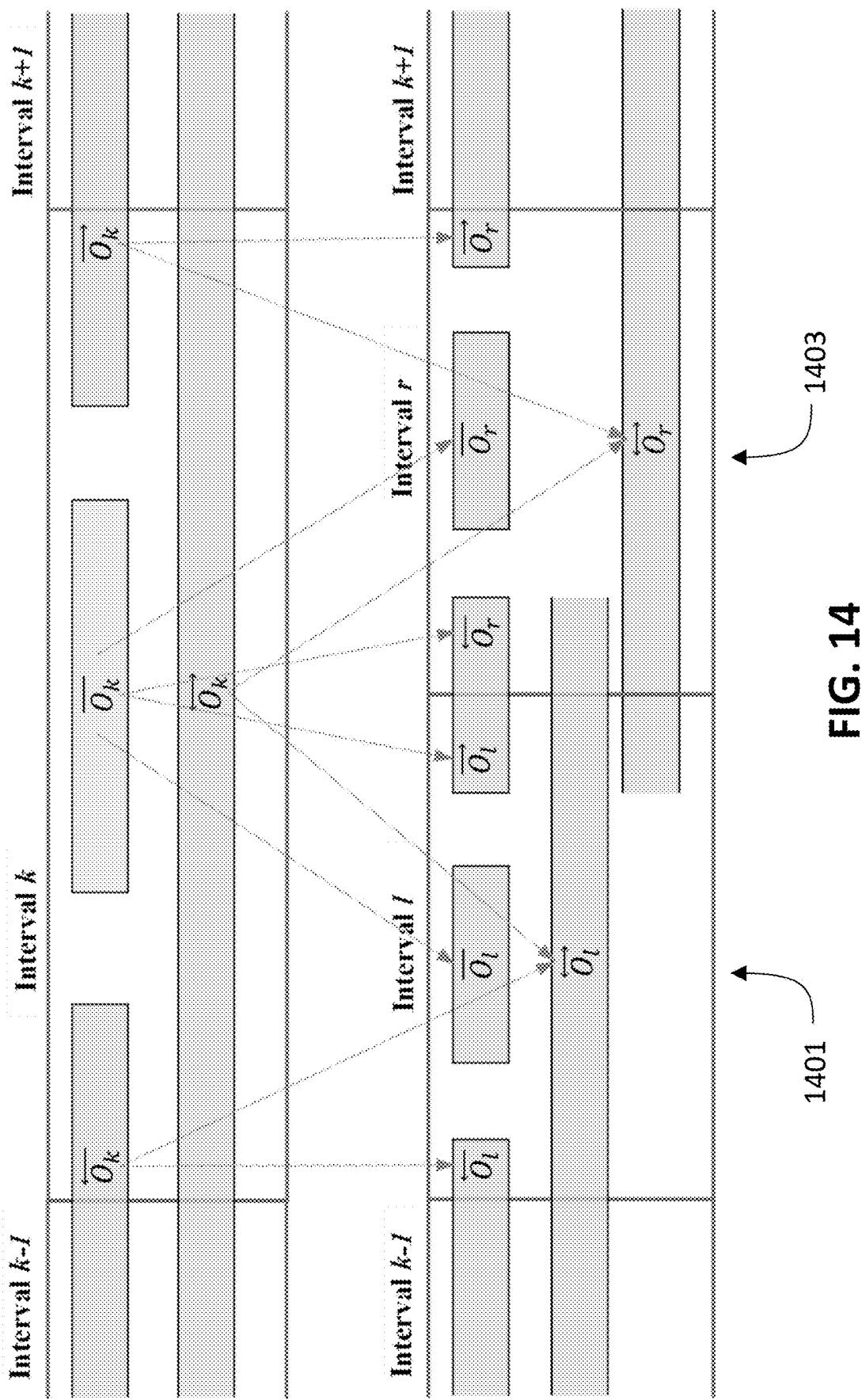
FIG. 14 provides an illustration of interval splitting employed when an interval is greater than other intervals, or the number of objects within an object range is relatively greater than others.

Interval Splitting. The interval splitting is to split an interval k into two adjacent intervals l and r. This operation can be performed when the width of interval k is relatively much greater than others and/or when $|\overleftarrow{O_k}|$ or $|\overrightarrow{O_k}|$ is relatively much greater than the others like $|\overleftrightarrow{O_k}|$, $|\overleftrightarrow{O_k}|$, $|\overrightarrow{O_k}|$, and $|\overline{O_k}|$. For ORH-1, an interval can be split into two equal-width intervals. For ORH-2 and ORH-3, there would be more choices than the equal-width splitting, based on the statistics of interval k. For a right-heavy interval, wherein $|\overrightarrow{O_k}|$ is relatively greater than the other intervals, the width of an interval r can be determined to $S_k(c, \overrightarrow{O_k})/|\overrightarrow{O_k}|$. So, after the splitting, the right-side of the interval k can be paid more attention for new objects. For ORH-2 and ORH-3, FIG. 14 shows how the four types of objects in $\overleftarrow{O_k}$, $\overleftrightarrow{O_k}$, $\overrightarrow{O_r}$ and $\overline{O_k}$, can be classified in terms of intervals l (1401) and r (1403).

For $\overleftarrow{O_k}$, it is not obvious that an object in $\overleftarrow{O_k}$ belongs to either $\overleftarrow{O_l}$ or $\overrightarrow{O_l}$. With ORH-2, it is assumed that all objects in $\overleftarrow{O_k}$ belong to $\overleftarrow{O_l}$ if the average object width of $\overleftarrow{O_k}$ is less than the width of interval l, Otherwise, all objects in $\overleftarrow{O_k}$ belong to $\overrightarrow{O_l}$, (i.e., if the average object width of $\overleftarrow{O_k}$ is less than the width of interval l). With ORH-3, based on the standard deviation of object widths and the normal distribution probability density, we can estimate how many objects in $\overleftarrow{O_k}$ have their widths greater than the width of interval l. Those objects are considered as belonging to $\overleftarrow{O_l}$.

For $\overrightarrow{O_k}$ the same technique can be used as it is done for $\overleftarrow{O_k}$, according to the average object widths (as well as the standard deviation) of $\overrightarrow{O_k}$ and the width of interval r.

For $\overline{O_k}$ an object in $\overline{O_k}$ may belong to $\overline{O_l}$, ($\overrightarrow{O_l}$ and $\overleftarrow{O_r}$), or $\overline{O_r}$. Note that $\overrightarrow{O_l}$ and $\overleftarrow{O_r}$ must be the same because none of objects in $\overline{O_k}$ span intervals k−1 and k+1. If an object in $\overline{O_k}$ belongs to $\overrightarrow{O_l}$, it also belongs to $\overleftarrow{O_r}$. That is, an object in $\overline{O_k}$ belongs to both $\overrightarrow{O_l}$ and $\overleftarrow{O_r}$, or neither $\overrightarrow{O_l}$ nor $\overleftarrow{O_r}$. The ratio of how many objects belong to $\overline{O_l}$, both ($\overrightarrow{O_l}$ and $\overleftarrow{O_r}$) and $\overline{O_r}$ can be estimated proportionally, based on the widths of interval l and r, and based on the average object width of $\overline{O_k}$. For example, suppose discrete data, then the total number of possible positions where an average-width object can start in $\overline{O_k}$ is (W([I Min k:I Max k])−Awk+1). The number of positions where an average-width object does not span the interval r is (W([I Min l:I Max l])−Awk+1). The number of positions where an average-width object starts at I Min r and does not span interval k+1 is (W([I Min r:I Max r])−Awk+1). Once $\overline{O_l}$ and $\overline{O_r}$ are determined, the rest are estimated to belong to both ($\overrightarrow{O_l}$ and $\overleftarrow{O_r}$).

For $\overleftrightarrow{O_k}$, it is obvious that all objects belong to both $\overleftarrow{O_l}$ and $\overrightarrow{O_r}$ at the same time. Nonetheless, note that $\overleftrightarrow{O_l}$ and $\overleftrightarrow{O_r}$ could be different, because different number of objects can come from $\overleftarrow{O_k}$ to $\overleftarrow{O_l}$, and from $\overrightarrow{O_k}$ to $\overrightarrow{O_l}$.

Interval Removal. The interval removal is to get rid of an interval so that the interval may not be maintained anymore. It can happen when existing objects are removed and there is no object whose range overlap the interval. Note that it happens on the first or the last interval, so that the starting boundary of the first interval and the upper boundary of the last interval match the global minimum value and the global maximum value.

Parallelism and Multiple Histograms. When there are multiple parallel processing units (PPUs) to build an ORH, a PPU can build its own ORH for the data assigned to the PPU (i.e., as data objects are generated for the data). It is also possible that one PPU partitions its own data and creates multiple ORHs for each column. In such a case, the final estimate for a column is the sum of the estimates from all individual ORHs. If it is not tolerable to iteratively compute the estimate for each ORH, or if it is not tolerable to keep and maintain multiple ORHs for a column, then those multiple ORHs for a column can be combined. Note that ORHs may have different interval boundaries. To align interval boundaries of two ORHs, the interval splitting operation and the interval merging operation can be performed.

The approaches for estimating cardinality, determining query execution plan costs, and selecting a query plan for execution in systems where data is saved in objects described herein provide a unique approach to improve workload performance and costs within database management systems employing external object storage. In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method for executing a query in a database system comprising a processor, said method comprising the steps of:
   establishing a connection with an object storage system, wherein said object store is configured to store:
   a dataset comprising a plurality of data, wherein said dataset is distributed across a plurality of objects, wherein each object is defined by a portion of data of said dataset; and
   statistics about each object, wherein the statistics comprise minimum and maximum values for data of said portion of the said dataset for each said object;
   maintaining within said database system a set of global statistics comprising the number of objects within said object storage system and the minimum and maximum values for said portion of data within each object;
   receiving, by said processor, a database query seeking access to said dataset stored within said object storage system;
   generating, by said processor, a query execution plan for said query;
   determining, by said processor, from said set of global statistics, a number of objects to be accessed by said query execution plan;
   determining, by said processor, from the number of objects to be accessed by said query execution plan a cost of execution of said query execution plan;
   comparing, by said processor, the cost of said query execution plan with the costs of one or more additional query execution plans to select a query execution plan having a lowest cost; and
   executing said query in accordance with said selected query execution plan.

2. The method for executing a query in a database system in accordance with claim 1, wherein:
   said dataset comprises a database table with table rows stored in different objects;
   said minimum value and the maximum values comprise minimum and maximum values for each table column within an object; and
   said global statistics comprise the number of objects within said object storage system and the minimum and maximum values for each table column within each object.

3. The method for executing a query in a database system in accordance with claim 1, wherein:
   said object storage system comprises a cloud-based object storage system.

4. The method for executing a query in a database system in accordance with claim 2, wherein:
   said set of global statistics further comprises, for each table column within said database table, a sum of object range widths of said table column; and
   said step of determining a number of objects to be accessed by said query execution plan comprises:
   determining from said sum of object range widths for each said table column, an average object range width for each said table column; and
   determining from said minimum and maximum values for each table column and said average range width for each table column, the number of objects to be accessed by said query.

5. The method for executing a query in a database system in accordance with claim 4, wherein:
   said step of determining an average object range width for each said table column comprises grouping object value ranges having similar widths, and determining an adjusted average range width for each group; and
   said step of determining a number of objects to be accessed by said query execution plan comprises determining from said minimum and maximum values for each table column and said adjusted average range widths, the number of objects to be accessed by said query.

6. The method for executing a query in a database system in accordance with claim 2, wherein said step of determining a number of objects to be accessed by said query execution plan comprises:
   determining, for each said table column, an object range histogram, said object range histograms comprising a set of intervals for each said table column;
   for each said table column, combining said intervals that overlap a qualified range of values into a combined interval; and
   for each said table column, determining a number of objects included within said combined interval.

7. The method for executing a query in a database system in accordance with claim 2, wherein said step of determining a number of objects to be accessed by said query execution plan comprises:

determining, for each said table column, an object range histogram, said object range histograms comprising a set of intervals for each said table column;

determining a number of objects included within each interval within said set of intervals; and combining the number of objects included within each interval within said set of intervals to determine a number of objects to be accessed by said query execution plan.

8. A database system comprising:

a processor;

a non-transitory storage medium containing instructions executable on said processor; and an object storage system accessible by said processor, said object storage system configured to store:

a dataset comprising a plurality of data, wherein said dataset is distributed across a plurality of objects, wherein each object is defined by a portion of data of said dataset; and statistics about each object, wherein the statistics comprise minimum and maximum values for data of said portion of the said dataset for each said object;

said instructions executable on said processor include instructions for:

receiving a database query seeking access to data stored within said object storage system;

generating a query execution plan for said query;

determining from said set of global statistics, a number of objects to be accessed by said query execution plan;

determining from the number of objects to be accessed by said query execution plan a cost of execution of said query execution plan;

comparing the cost of said query execution plan with the costs of one or more additional query execution plans to select a query execution plan having a lowest cost; and executing said query in accordance with said selected query execution plan.

9. The database system in accordance with claim 8, wherein:

said dataset stored within said object store system comprises a database table with table rows stored in different objects;

said minimum value and the maximum values comprise minimum and maximum values for each table column within an object; and said global statistics comprise the number of objects within said object storage system and the minimum and maximum values for each table column within each object.

10. The database system in accordance with claim 8, wherein:

said object storage system comprises a cloud-based object storage system.

11. The database system in accordance with claim 9, wherein:

said set of global statistics further comprises, for each table column within said database table, a sum of object range widths of said table column; and determining a number of objects to be accessed by said query execution plan comprises:

determining from said sum of object range widths for each said table column, an average object range width for each said table column; and determining from said minimum and maximum values for each table column and said average range width for each table column, the number of objects to be accessed by said query.

12. The database system in accordance with claim 11, wherein:

determining an average object range width for each said table column comprises grouping object value ranges having similar widths, and determining an adjusted average range width for each group; and determining a number of objects to be accessed by said query execution plan comprises determining from said minimum and maximum values for each table column and said adjusted average range widths, the number of objects to be accessed by said query.

13. The database system in accordance with claim 9, wherein determining a number of objects to be accessed by said query execution plan comprises:

determining, for each said table column, an object range histogram, said object range histograms comprising a set of intervals for each said table column;

for each said table column, combining said intervals that overlap a qualified range of values into a combined interval; and for each said table column, determining a number of objects included within said combined interval.

14. The database system in accordance with claim 9, wherein determining a number of objects to be accessed by said query execution plan comprises:

determining, for each said table column, an object range histogram, said object range histograms comprising a set of intervals for each said table column;

determining a number of objects included within each interval within said set of intervals; and combining the number of objects included within each interval within said set of intervals to determine a number of objects to be accessed by said query execution plan.

* * * * *